Jan. 20, 1959  S. O. JONES  2,870,322
STUD WELDING GUN
Filed Dec. 27, 1957
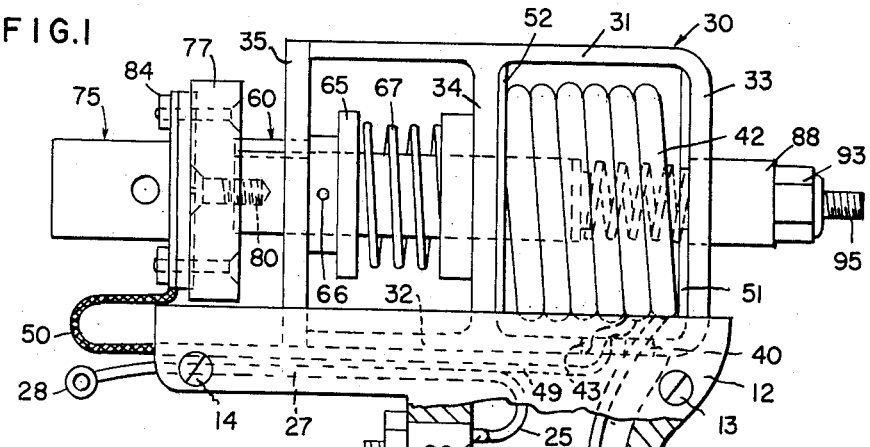
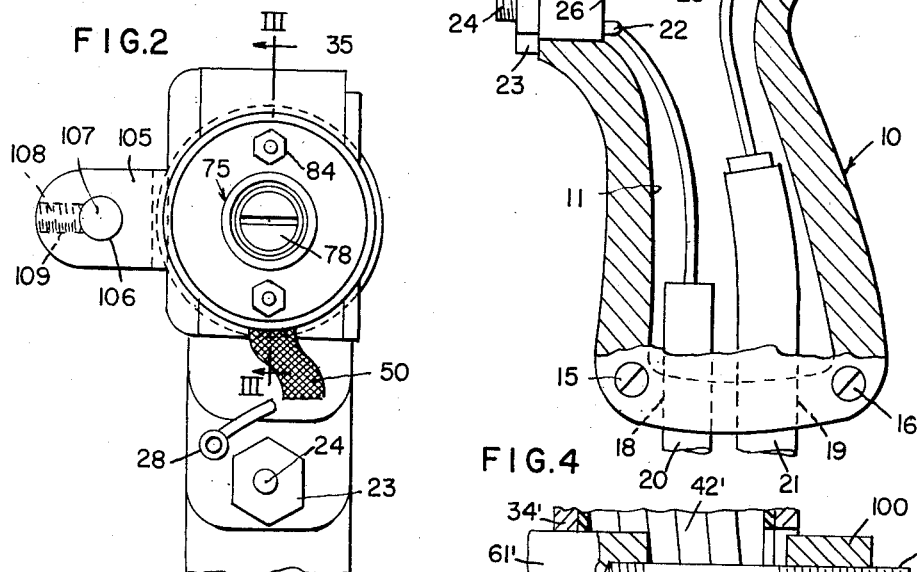
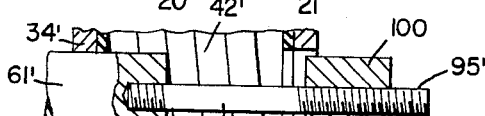
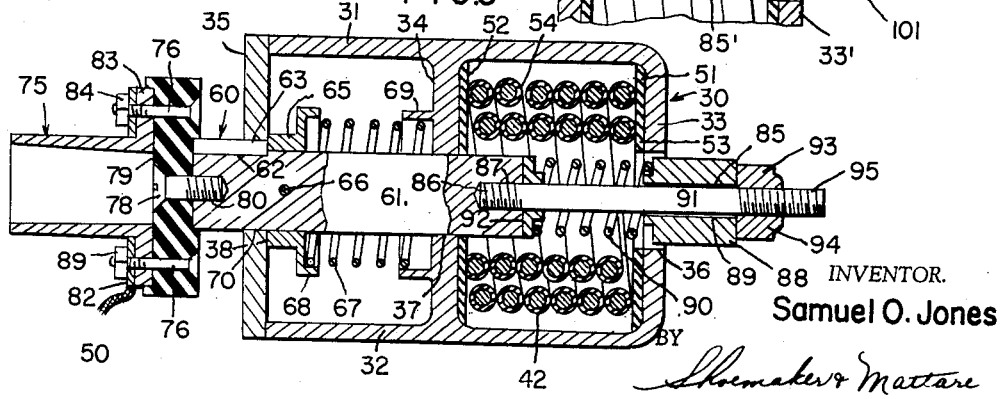
INVENTOR.
Samuel O. Jones
BY Shoemaker & Mattare
ATTYS

United States Patent Office 2,870,322
Patented Jan. 20, 1959

2,870,322

STUD WELDING GUN

Samuel O. Jones, Newport News, Va., assignor to Newport News Shipbuilding and Dry Dock Company, Newport News, Va., a corporation of Virginia Application December 27, 1957, Serial No. 705,618

9 Claims. (Cl. 219—98)

The present invention relates to a new and novel stud welding gun and more particularly to a stud welding gun utilized with condenser discharge welding systems.

In the shipbuilding industry a great deal of welding must, of necessity, be done in such a position that the operator is forced to hold the gun in an elevated position as, for example, when welding pins or studs to the overhead. When conventional stud welding guns are used in such operations, the operator becomes quickly fatigued when welding is necessitated over extended periods of time due to the excessive weight of such known guns. Fatigue on the part of the operator, of course, results in inefficient operation and loss of work time.

It is accordingly evident that it is highly desirable to provide a stud welding gun which is as light as possible, while at the same time providing a construction which produces welds of good quality and which will operate reliably for long periods of time. The stud welding gun according to the present invention includes a lightweight hollow handle which supports a frame of open construction. The frame, in turn, supports the remaining components of the gun, and the construction is such that the weight is reduced to a minimum and the various components of the device are efficiently cooled by air which circulates through the open sides of the frame. The solenoid of the gun carries the welding current which is transmitted to the chuck of the device, thereby reducing the amount of wiring required to a minimum.

The invention stud welding gun is especially adapted for use in condenser discharge welding systems, and is provided with a plunger means which is reciprocably mounted within the frame. A chuck is secured to one end of the plunger means and a core means is secured adjacent the opposite end of the plunger means. A resilient means in the form of a spring urges the plunger and associated chuck forwardly of the gun toward an associated work piece, upon which it is desired to weld a stud mounted within the chuck. When welding current is supplied to the chuck, the core means is simultaneously urged forwardly and a connection between the core means and the plunger means transmits a forward thrust to the plunger means additionally urging it toward the associated work piece. In this manner, the end of the stud is fused and at the same time the stud is urged toward the work piece to thereby insure a good quality weld.

An object of the present invention is to provide a new and novel stud welding gun, the weight of which is reduced to a minimum and which provides welds of good quality.

Another object of the invention is the provision of a stud welding gun, the components of which may be quickly and easily cleaned, repaired or replaced.

A further object of the invention is to provide a stud welding gun wherein the components thereof are provided with a maximum of ventilation for reducing the heat generated during operation.

Yet another object of the invention is the provision of the stud welding gun which is simple and inexpensive in construction, yet efficient and reliable in operation.

Other objects and many of the attendant advantages of the present invention will become more apparent when considered in connection with the following specification and accompanying drawing wherein:

Fig. 1 is a side elevational view of the improved stud welding gun with portions of the handle cover plate broken away to show the internal features thereof, Fig. 2 is a front elevational view of the upper portion of the gun shown in Fig. 1, Fig. 3 is a vertical section taken along line III—III of Fig. 2, and Fig. 4 illustrates a modification of the device.

Referring now to the drawings wherein like reference characters designate corresponding parts throughout the several views, there is shown in Fig. 1 a handle assembly indicated generally by reference numeral 10 which is formed of a suitable insulating material such as plastic. A recess 11 extends inwardly from one side of the handle and is normally covered by a plate 12 secured to the handle by means of suitable fasteners 13, 14, 15 and 16. The lower end of the handle is provided with apertures 18 and 19 through which project insulated conductors 20 and 21 respectively.

Conductor 21 carries the welding current and conductor 20 is connected to one terminal 22 of a trigger switch 23 having an actuating plunger 24 slidably mounted therein. Another conductor 25, connected to the opposite terminal 26 of the trigger switch, extends through a suitable groove 27 formed in the upper portion of the handle forwardly of the gun and is provided at its outer end with a terminal 28 which is adapted to be connected to a suitable ground for the electrical system employed with the gun. When plunger 24 of the trigger switch is depressed, the circuit through conductors 20, 25 is completed, and the associated welding supply of any suitable type (not shown) is energized so as to supply welding current to conductor 21.

A frame means indicated generally by reference numeral 30 is formed of a suitable material such as steel or the like and is preferably of welded construction, comprising an upper wall 31 and a lower wall 32 interconnected by means of a rear end wall 33 and an intermediate wall 34 extending laterally between the upper and lower walls. A cover plate 35, composed of a suitable material such as brass or the like, is secured to the forward end of the frame and forms the forward wall thereof. The lower portion of the frame is embedded in the upper portion of the plastic handle, thereby permanently affixing the frame to the handle. Referring to Fig. 3, aligned openings 36, 37 and 38 are provided through walls 33, 34 and 35 respectively.

Referring again to Fig. 1, conductor 21 passes upwardly through an opening 40 formed through lower wall 32 of the frame and is wrapped in a cylindrical form as shown to provide a solenoid coil 42. The opposite end of coil 42 extends downwardly through an opening 43 provided in lower wall 32 of the frame and is disposed in a groove 49 formed in the upper portion of the handle, the forward portion of said opposite end of the solenoid coil terminating in a flexible braided lead 50. Two sheets of insulating material 51 and 52 are disposed between opposite ends of the solenoid coil and the adjacent surfaces of the end and intermediate walls of the frame for insulating the coil from the frame. As seen more clearly in Fig. 3, insulating sheet 51 is provided with a central aperture 53 and insulating sheet 52 is provided with a central aperture 54.

A plunger means indicated generally by reference numeral 60 includes a cylindrical rod 61 composed of a suitable substantially non-magnetic material such as brass or the like, and is reciprocably journalled within openings 37 and 38 in walls 34 and 35 respectively. Rod 61 is provided with a key 62 fitted within a keyway 63 in plate 35 which enables the rod to reciprocate within opening 38, but prevents relative rotation between the rod and the frame. An annular collar 65 is fixed to rod 61 by means of a pin 66, and a compression spring 67 is connected between collar 65 and the forward surface of wall 34. Annular flange 68 on collar 65 and an annular flange 69 on the forward surface of wall 34 serve to maintain the opposite ends of spring 67 in proper operative position. It is apparent that compression spring 67 normally urges rod 61 forwardly and outwardly of the frame until outer surface 70 of collar 65 engages the inner surface of wall 35.

A conventional chuck assembly indicated generally by reference numeral 75 is attached to the forward end of the plunger means. The chuck is preferably insulated from the plunger, and accordingly the chuck is secured by means of screws 76 to a bushing 77 formed of a suitable electric insulating material, the bushing being, in turn, secured to the outer end of rod 61 by a screw 78 passing through a central aperture 79 formed in the bushing and being threaded into a correspondingly threaded opening 80 formed in the outer end of the rod.

Braided lead 50 which carries the welding current is connected to an annular terminal 82 which engages flange 83 of chuck 75 and is held in place by screws 76 in cooperation with bolts 84 mounted upon the screws. In this manner an electrical connection is provided to the chuck such that welding current may be supplied thereto, and the chuck remains electrically insulated from the plunger means.

Plunger means 60 also includes a rearwardly extending rod 85 formed of a suitable non-magnetic material such as brass or the like, having a threaded portion 86 at the forward end thereof which is threaded within a correspondingly threaded opening 87 provided in the rear of rod 61. A solenoid core means 88, composed of a suitable magnetic material such as iron or a substance including elements of the iron family, for example, has a longitudinally extending opening 89 formed therethrough and is slidably mounted on an intermediate portion of rod 85 of the plunger means. A compression spring 90 is connected between the forward surface 91 of the core means 88 and a spring keeper member 92 mounted on rod 85, the spring keeper member also being composed of a suitable non-magnetic material. An adjusting nut 93 having a longitudinally extending threaded opening 94 is threaded upon the rearward threaded end 95 of rod 85 of the plunger means, and is formed of non-magnetic material.

It is apparent that the rear end of the plunger means extends through opening 36 in rear end wall 33 of the frame and that the core means supported by rod 85 also projects through the opening and is disposed normally in a position rearward of solenoid coil 42. The position of the core means relative to the plunger means may be adjusted by advancing or retracting adjusting nut 93 along the rear threaded end portion 95 of the plunger means. When solenoid coil 42 is energized, core means 88 is urged forwardly into the central opening formed through the solenoid coil; and through the intermediary of compression spring 90, core means 88 urges the plunger means forwardly of the frame.

Referring to Fig. 4, a modification is illustrated wherein the core means 100 is provided with a threaded opening 101 extending longitudinally therethrough, and is threaded upon the rear threaded end portion 95' of rod 85' of the plunger means. The remaining components of the modification shown in Fig. 4 are identical with those shown in the device illustrated in Fig. 3, and corresponding parts have been given like reference numerals primed. Upon energization of solenoid coil 42' of the device shown in Fig. 4, core means 100 will be urged forwardly of the frame into the opening formed centrally through the solenoid coil, thereby carrying the plunger means forwardly of the frame.

As seen more clearly in Fig. 2, cover plate 35 is provided at one side thereof with an outwardly projecting ear 105 having an opening 106 formed therethrough within which a probe member 107 is slidably disposed. The probe is normally positioned in opening 106 such that the outer end of the probe extends forwardly of the frame and in a position to engage the work piece during welding operations, the probe being held in proper operative position by means of a set screw 108 threaded within a laterally extending threaded opening 109 formed in ear 105.

In operation, a stud or pin is initially inserted within chuck assembly 75 such that the outer end of the stud or pin projects slightly beyond the outer end of probe 107. When the gun is placed in operative position, the probe will engage the work piece and the engagement between the outer end of the stud or pin and the work piece causes the plunger means to be actuated slightly inwardly thereby compressing compression spring 67. When the trigger plunger 24 is actuated, welding current is supplied to conductor 21 and through solenoid coil 42 and lead 50 to the chuck assembly 75. Upon energization of the solenoid coil, the core means is pulled forwardly, thereby applying a forward thrust to the plunger means such that the associated chuck and stud mounted therein are urged toward the work piece. In this manner, welding current is supplied to the chuck and bolt to produce fusion between the outer end of the bolt and the work piece, and thrust is simultaneously applied to the bolt urging it toward the work piece, thereby insuring a good weld.

Welding current will flow until the condensers of the associated supply circuit (not shown) have discharged, at which time the circuit preferably is provided with a means for automatically de-energizing the solenoid and the chuck, thereby eliminating the forward thrust upon the core means and reducing the force urging the plunger means forwardly of the frame.

In each of the modifications disclosed herein, the core means is adapted to move forwardly within the solenoid coil and is normally initially positioned rearwardly of the center portion of the coil such that upon energization of the coil, the core means is urged forwardly. The relative position of the core means on the plunger means may be selectively adjusted for varying the amount of forward thrust which is applied to the core means. The open sided construction of the frame enables air to circulate about the components of the device and also provides easy access to the components mounted within the frame such that they may be easily cleaned and repaired or replaced, if necessary. The weight of the stud welding gun according to the present invention is approximately three pounds in contrast to prior art guns of this type which weigh approximately eight pounds. It is apparent that a great saving in weight is obtained with the present construction thereby substantially reducing the amount of effort and resulting fatigue of an operator when utilizing the invention gun during welding operations.

It is apparent from the foregoing that there is provided a new and novel stud welding gun wherein the weight is reduced to a minimum, and at the same time welds of good quality are obtainable therewith. The stud welding gun may be easily cleaned and repaired and parts may be replaced with a minimum of effort. Cooling of the components of the device is increased to a maximum thereby eliminating excessive heating during operation. The device is simple and inexpensive in construction and yet is efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A stud welding gun which comprises a handle means, a frame secured to said handle means, a solenoid coil supported by said frame, plunger means reciprocably supported by said frame and being composed of a substantially nonmagnetic substance, resilient means normally urging said plunger means to an outermost position, core means mounted on said plunger and being composed of a magnetic substance, a stud chuck secured to one end of said plunger means, and means for energizing said coil and said chuck to urge said core means and said plunger means outwardly of said frame and establish welding current to said chuck.

2. A stud welding gun which comprises a handle means, a frame secured to said handle means and having forward and rearward portions, said portions each having an opening formed therethrough, a solenoid coil supported by said frame, plunger means reciprocably supported by said frame and being composed of a substantially nonmagnetic substance, said plunger means extending forwardly through the opening in said forward portion and also extending rearwardly through the opening in said rearward portion, resilient means normally urging said plunger means forwardly to an outermost position, core means mounted on said plunger means adjacent the rearward end of said plunger means and being composed of a magnetic substance, a stud chuck secured to the forward end of said plunger means, and means for energizing said coil and said chuck to urge said core means and said plunger means forwardly of said frame and establish welding current to said chuck.

3. A device as defined in claim 2 wherein said solenoid coil defines an opening longitudinally therethrough, said plunger means being normally disposed within said coil opening, and said core means being movable longitudinally within said opening upon energization of said solenoid coil.

4. A device as defined in claim 2 wherein said core means is fixed to said plunger means.

5. A device as defined in claim 2 wherein said core means is slidable relative to said plunger means, resilient means connected between said core means and said plunger means for transmitting the forward thrust of said core means to said plunger means, and means for selectively adjusting the position of said core means with respect to said plunger means.

6. A stud welding gun which comprises a handle means, a frame secured to said handle means, said frame being of open-sided construction and including a forward wall, a rearward wall and an intermediate wall disposed between the other two walls, a solenoid coil supported by said frame, plunger means reciprocably supported by said forward and intermediate walls and being composed of a substantially nonmagnetic substance, resilient means normally urging said plunger means forwardly to an outermost position, core means mounted on said plunger and being composed of a magnetic substance, a stud chuck secured to one end of said plunger means, and trigger means carried by said handle means for selectively energizing said coil and said chuck to urge said core means and said plunger means forwardly of said frame and establish welding current to said chuck.

7. A device as defined in claim 6 including a collar means secured to said plunger means adjacent the forward end thereof, said resilient means being connected between said collar means and the forward surface of said intermediate wall, said solenoid coil being disposed between said intermediate wall and said rearward wall.

8. A stud welding gun which comprises a handle means, a frame secured to said handle means, said frame being of open-sided construction and including a forward wall, a rearward wall and an intermediate wall disposed between the other two walls, each of said walls having an opening formed therethrough in alignment with one another, a solenoid coil supported by said frame, plunger means reciprocably supported within said openings in the forward and intermediate walls and extending through said opening in the rearward wall and being composed of a substantially nonmagnetic substance, resilient means normally urging said plunger means forwardly to an outermost position, core means mounted on said plunger means adjacent the rearward end of said plunger means and being composed of a magnetic substance, a stud chuck secured to the forward end of said plunger means, and trigger means carried by said handle means for selectively energizing said coil and said chuck to urge said core means and said plunger means forwardly of said frame and establish welding current to said chuck.

9. A stud welding gun which comprises a handle means, a body means supported by said handle means and having forward and rearward portions, a solenoid coil supported by said body means, plunger means slidably supported by said body means and being composed of a substantially non-magnetic substance, resilient means normally urging said plunger means forwardly to an outermost position, core means operatively connected to said plunger means and being composed of a magnetic substance, a stud chuck supported by one end of said plunger means, and means for energizing said coil and said chuck to urge said core means and said plunger means forwardly and establish welding current to said chuck.

References Cited in the file of this patent

UNITED STATES PATENTS

| | | |
|---|---|---|
| 2,191,494 | Nelson | Feb. 27, 1940 |
| 2,413,189 | Nelson | Dec. 24, 1946 |
| 2,439,830 | Varela | Apr. 20, 1948 |
| 2,464,967 | Dinnick | Mar. 22, 1949 |
| 2,473,772 | Vang | June 21, 1949 |
| 2,510,620 | Craven | June 6, 1950 |
| 2,763,755 | Graham | Sept. 18, 1956 |
| 2,776,362 | Welch | Jan. 1, 1957 |